(12) United States Patent
Haynes et al.

(10) Patent No.: US 7,014,442 B2
(45) Date of Patent: Mar. 21, 2006

(54) MELT SPINNING EXTRUSION HEAD SYSTEM

(75) Inventors: Bryan David Haynes, Cumming, GA (US); Michael Charles Cook, Marietta, GA (US); Kurtis Lee Brown, Alpharetta, GA (US); Chad Michael Freese, Martinez, CA (US); Brian Stephen Forbes, Alpharetta, GA (US); Robert James Gerndt, Roswell, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 316 days.

(21) Appl. No.: 10/335,498

(22) Filed: Dec. 31, 2002

(65) Prior Publication Data

US 2004/0126454 A1 Jul. 1, 2004

(51) Int. Cl.
*D01D 5/28* (2006.01)

(52) U.S. Cl. .............................. 425/131.5; 425/382.2; 425/464

(58) Field of Classification Search ............. 425/131.5, 425/382.2, 464
See application file for complete search history.

(56) References Cited

U.S. PATENT DOCUMENTS

| | | | |
|---|---|---|---|
| 2,734,224 A | 2/1956 | Winstead | |
| 3,000,053 A | 9/1961 | Hart | |
| 3,057,009 A | 10/1962 | Lipski | |
| 3,200,440 A | 8/1965 | Bryan et al. | |
| 3,381,074 A | 4/1968 | Bryan et al. | |
| 3,381,336 A | 5/1968 | Wells | |
| 3,752,616 A * | 8/1973 | Matsui et al. ............ | 425/131.5 |
| 3,767,347 A | 10/1973 | Landoni | |
| 4,017,240 A | 4/1977 | Nelson | |
| 4,032,279 A | 6/1977 | Kim | |

(Continued)

FOREIGN PATENT DOCUMENTS

GB 1193272 A 5/1970

(Continued)

*Primary Examiner*—Joseph S. Del Sole
(74) *Attorney, Agent, or Firm*—Christos Kyriakou; Robert A. Ambrose

(57) ABSTRACT

The present invention provides a series of plates for distributing a molten polymer composition, the series of plates includes at least two plates: a first plate that includes an upper surface, a lower surface, and a plurality of polymer distribution channels connecting the upper surface and the lower surface. In certain illustrated embodiments, the plurality of polymer distribution channels consist essentially of substantially horizontal channels at one or both the upper surface and lower surface and substantially linear downwardly sloping channels connecting the substantially horizontal channels at the upper surface to the substantially horizontal channels at the lower surface, the upper surface to the substantially horizontal channels at the lower surface or the substantially horizontal channels at the upper surface to lower surface; and a second plate that includes an upper surface, a lower surface, and a plurality of polymer distribution channels connecting the upper surface and the lower surface wherein the plurality of polymer distribution channels consist essentially of substantially horizontal channels at one or both the upper surface and lower surface and substantially linear downwardly sloping channels connecting the substantially horizontal channels at the upper surface to the substantially horizontal channels at the lower surface, the upper surface to the substantially horizontal channels at the lower surface or the substantially horizontal channels at the upper surface to lower surface.

7 Claims, 11 Drawing Sheets

U.S. PATENT DOCUMENTS

| | | |
|---|---|---|
| 4,307,054 A | 12/1981 | Chion et al. |
| 4,308,004 A | 12/1981 | Chion et al. |
| 4,445,833 A | 5/1984 | Moriki et al. |
| 4,648,826 A | 3/1987 | Ogasawara et al. |
| 4,846,653 A | 7/1989 | Beck et al. |
| 4,990,293 A | 2/1991 | Macosko et al. |
| 5,162,074 A | 11/1992 | Hills |
| 5,234,650 A | 8/1993 | Hagen et al. |
| 5,344,297 A | 9/1994 | Hills |
| 5,393,219 A | 2/1995 | Hagen et al. |
| 5,466,410 A | 11/1995 | Hills |
| 5,516,476 A | 5/1996 | Haggard et al. |
| 5,637,331 A | 6/1997 | Lenk et al. |
| 5,697,402 A | 12/1997 | Hodan et al. |
| 5,700,491 A | 12/1997 | Herwegh et al. |
| 5,733,586 A | 3/1998 | Herwegh et al. |
| 5,851,562 A | 12/1998 | Haggard et al. |
| 5,853,635 A | 12/1998 | Morell et al. |
| 5,922,362 A | 7/1999 | Schippers et al. |
| 5,927,590 A | 7/1999 | Herwegh et al. |
| 5,989,004 A | 11/1999 | Cook |
| 6,120,276 A | 9/2000 | Balk |
| 6,261,080 B1 | 7/2001 | Schroter et al. |
| 6,284,174 B1 | 9/2001 | Ueda et al. |
| 6,446,691 B1 | 9/2002 | Maldonado et al. |

FOREIGN PATENT DOCUMENTS

| | | |
|---|---|---|
| GB | 1391844 A | 4/1975 |

* cited by examiner

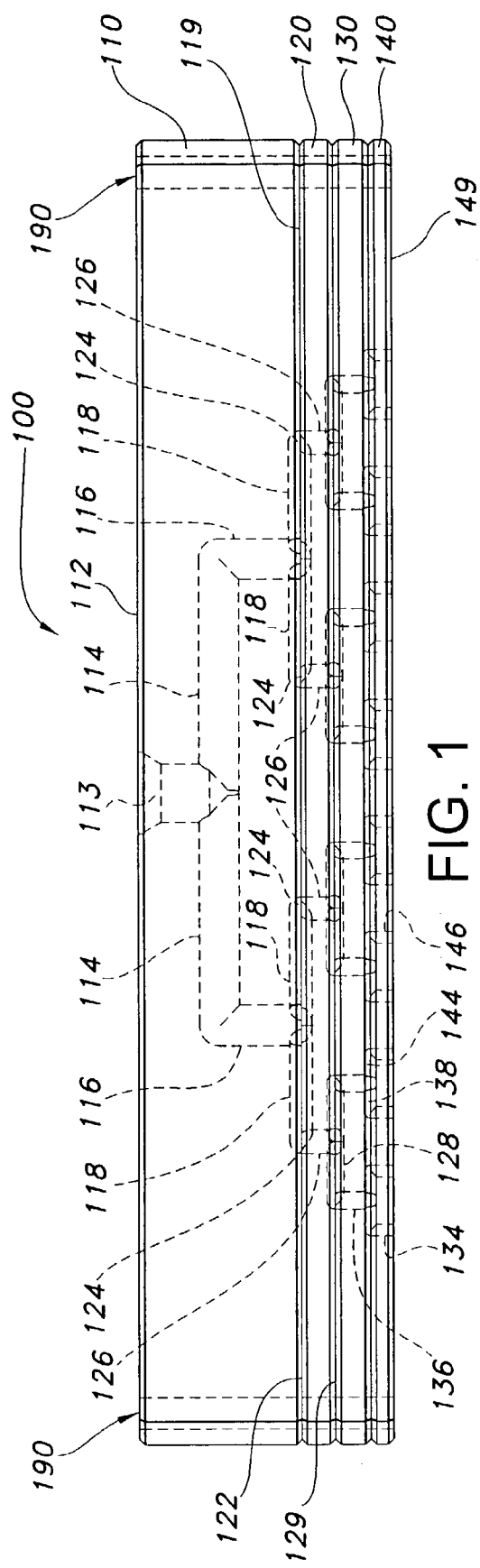
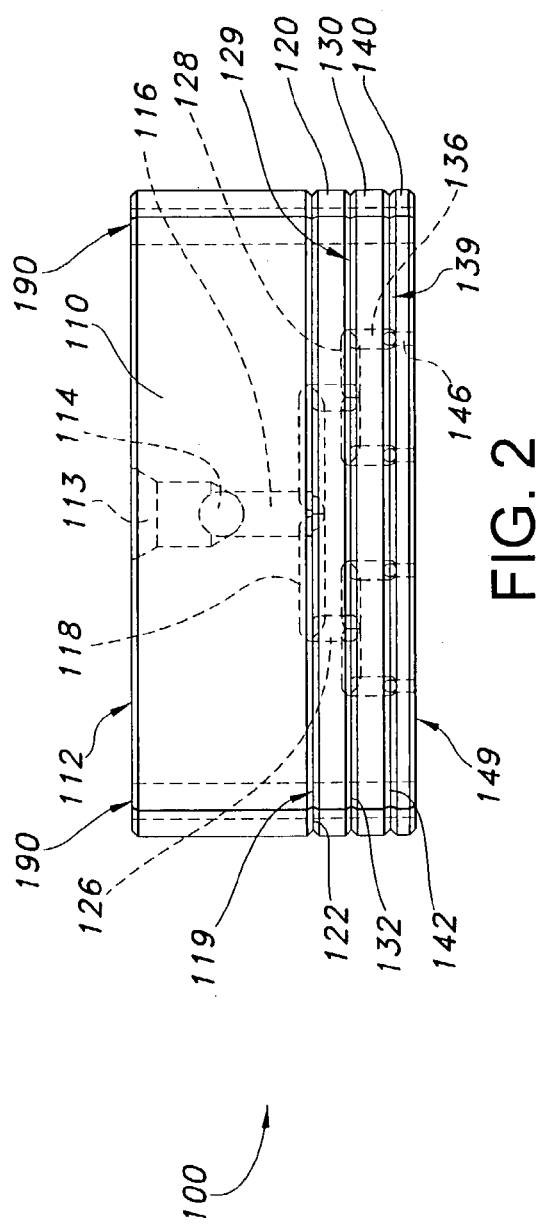
FIG. 1
FIG. 2

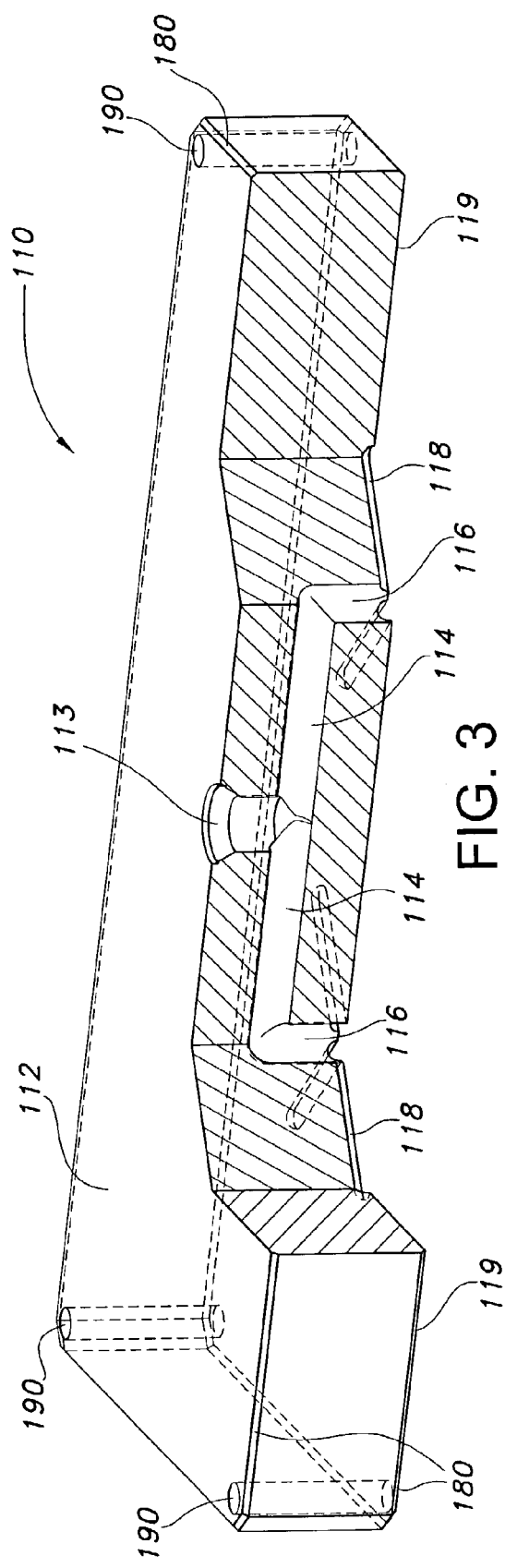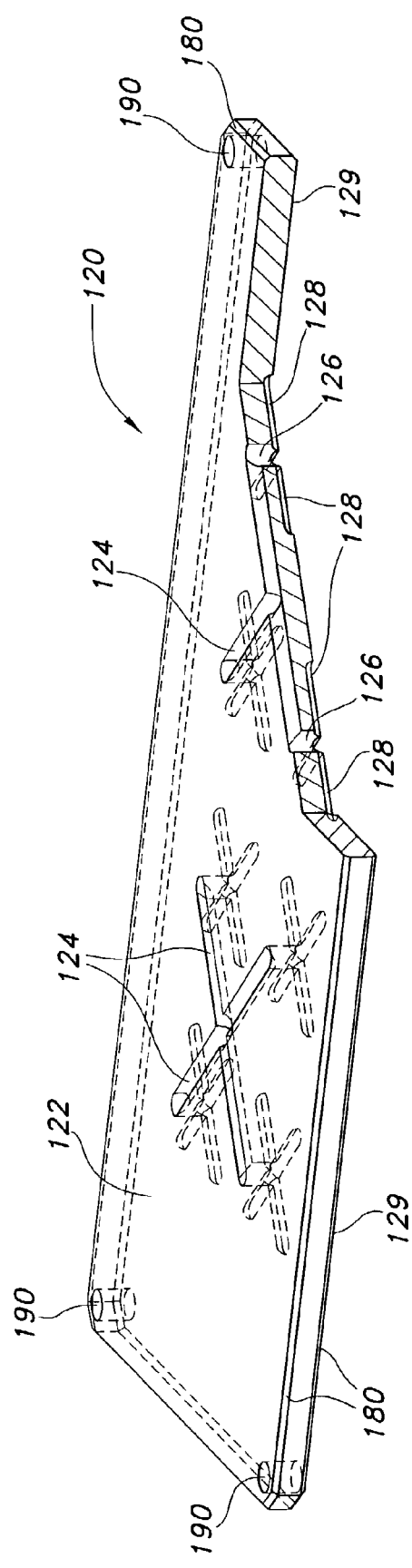

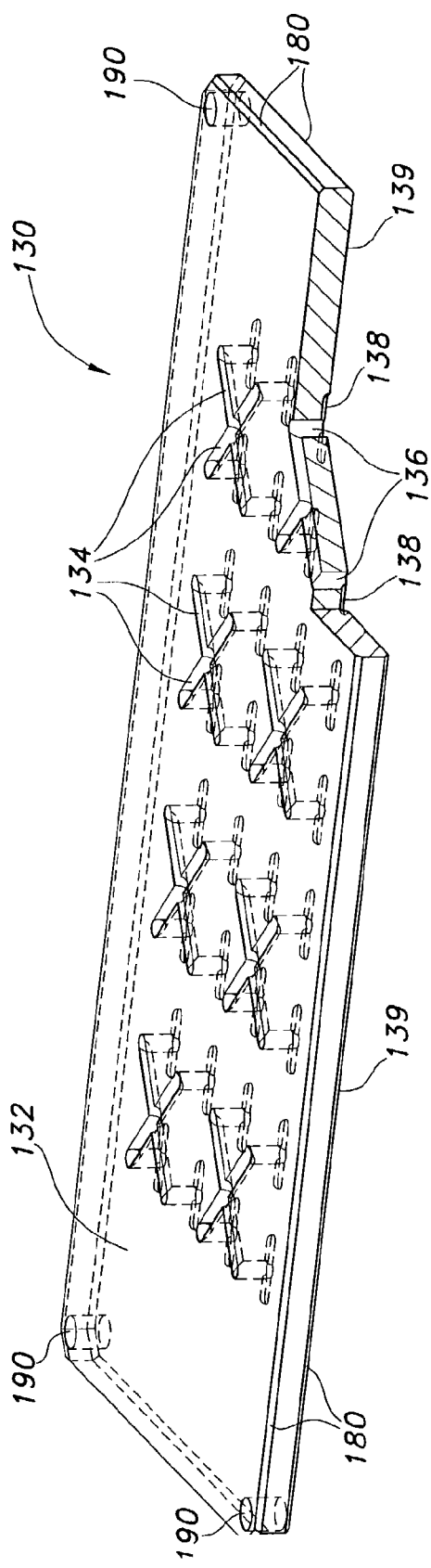
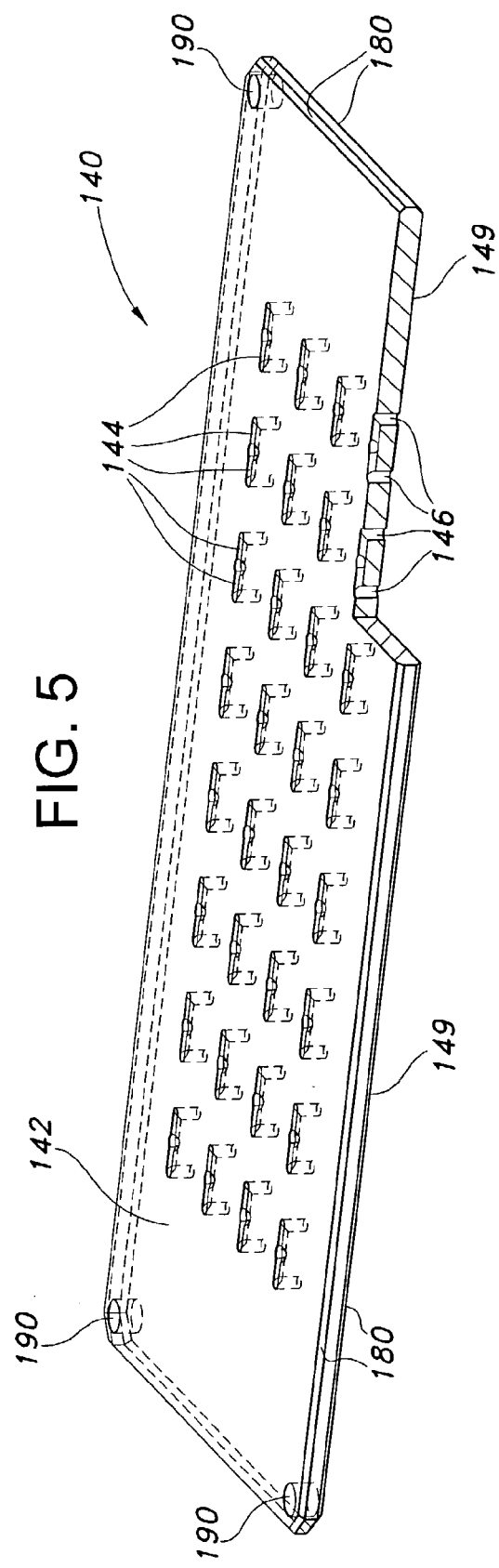

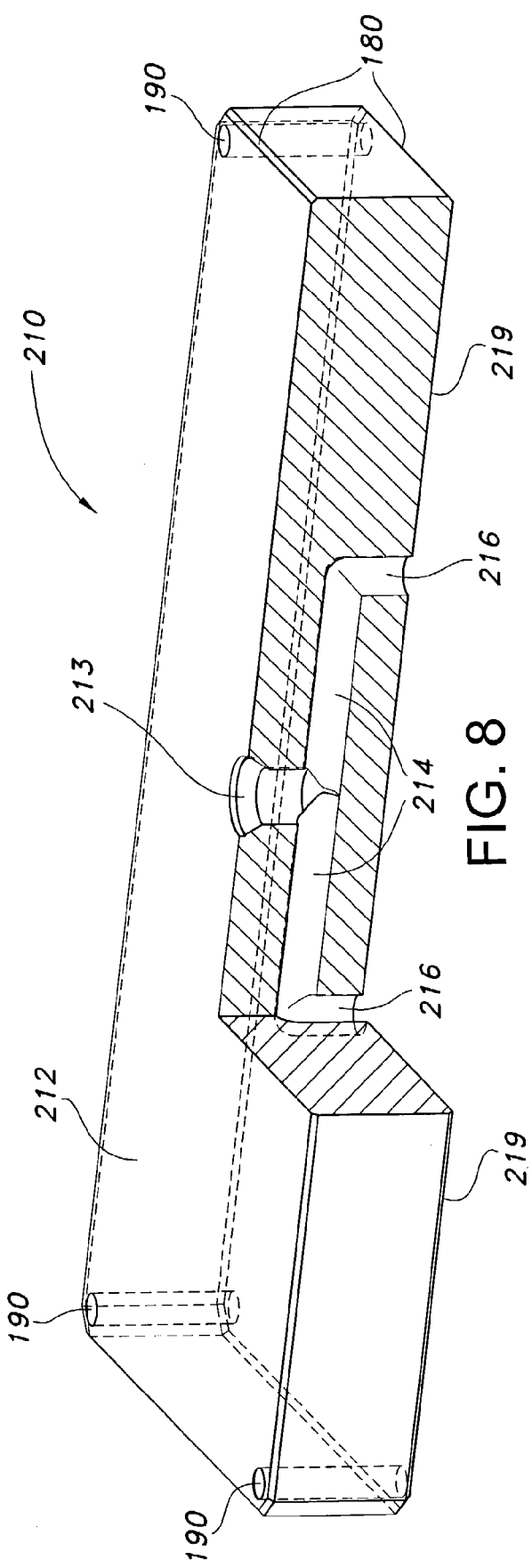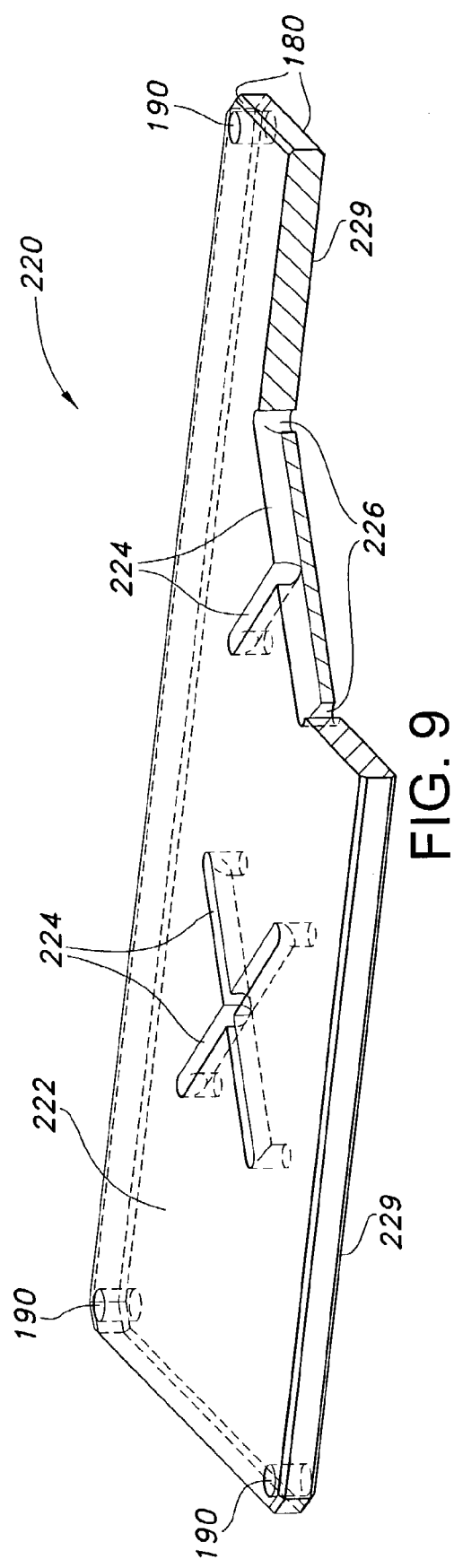

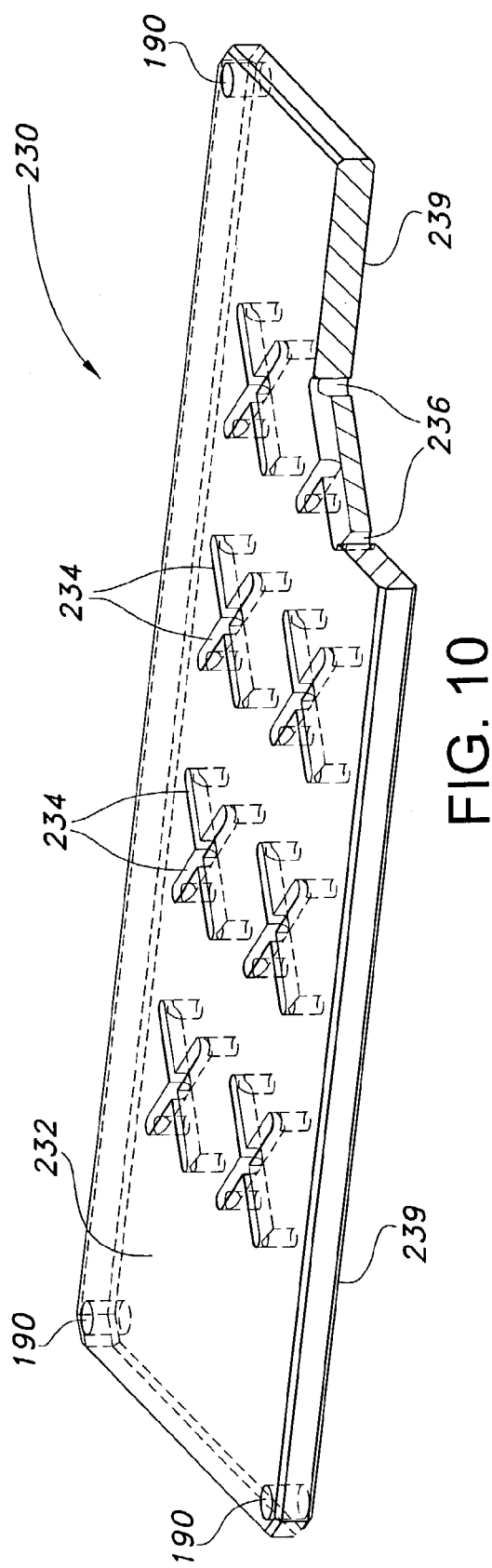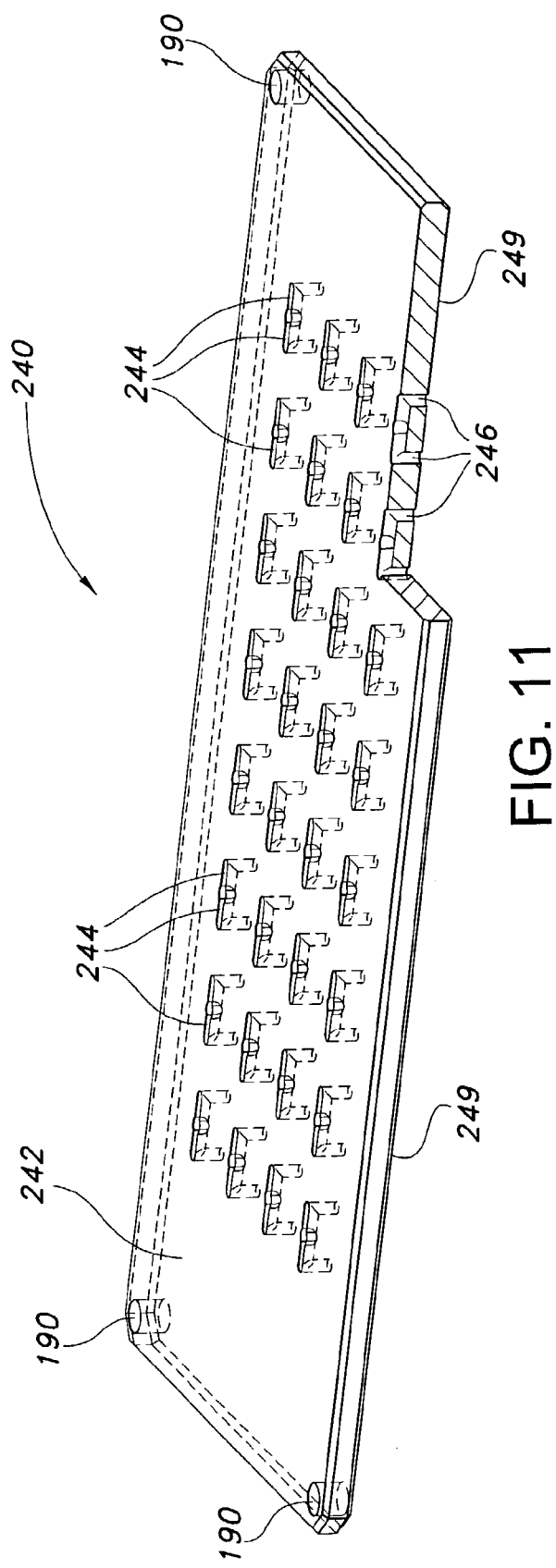

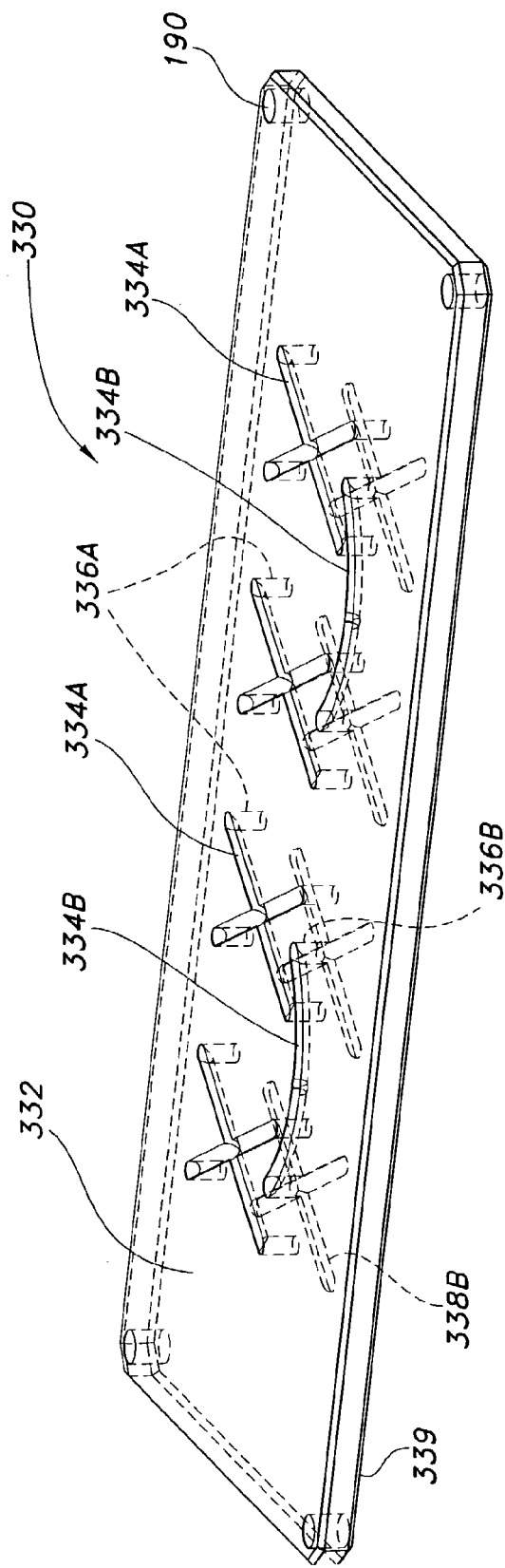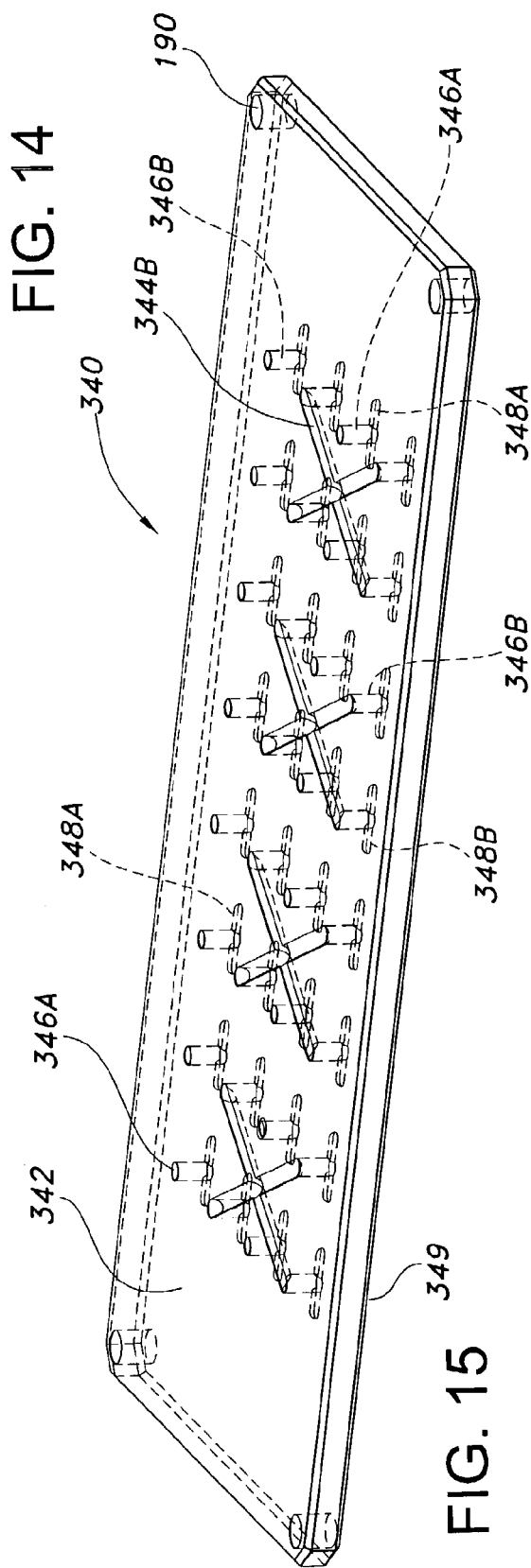

MELT SPINNING EXTRUSION HEAD SYSTEM

FIELD OF THE INVENTION

The present invention relates to an apparatus for distributing molten polymer to a plurality of orifices.

BACKGROUND

Challenges are encountered when plastic spunbonded filaments are melt extruded from a synthetic resin to form a spunbonded nonwoven fabric. Ordinarily a large number of threads are extruded from a single extrusion head, and among the challenges that are encountered are obtaining uniform thread size, uniform temperature across the whole of the extrusion head, and uniform flow distribution and pressure on extrusion orifices or spinnerettes. It would be desirable to provide an apparatus and a method of extruding a large number of fibers that provides uniform flow and temperature to the polymer composition from which the fibers are extruded and that imparts the same processing conditions and processing history to the melted polymer compositions at similar positions in the melt extrusion process. The spinnerettes may be single orifice spinnerettes for monofilament threads or groups of orifices to produce a multi-filament thread. Spinnerets are well known and are described and illustrated in U.S. Pat. No. 4,445,833.

An early attempt to extrude improved melt extruded threads was suggested in U.S. Pat. No. 3,057,009 to Lipski. Lipski describes an extrusion head in which melted synthetic resin is moved in the form of a relatively extended sheet to a series of orifices or spinnerettes which are a series of needles with hollow channels. Lipski utilizes a series of constrictions and expansions in the final channels to the extrusion orifices to distribute the molten resin to the needles. Lipski represented an improvement in the art but does not provide a distribution system that provides uniform processing time, temperature and history to processed polymer resin across the extrusion head.

Another attempt to solve the problems is presented in U.S. Pat. No. 3,381,336 to Wells.

SUMMARY

The present invention provides a series of stacked plates for distributing a molten polymer composition. In one embodiment, the series of stacked plates includes at least two plates: a first plate that includes an upper surface, a lower surface, and a plurality of polymer distribution channels connecting the upper surface and the lower surface wherein the plurality of polymer distribution channels consist essentially of substantially horizontal channels at one or both the upper surface and lower surface and substantially linear downwardly sloping channels connecting the substantially horizontal channels at the upper surface to the substantially horizontal channels at the lower surface, the upper surface to the substantially horizontal channels at the lower surface or the substantially horizontal channels at the upper surface to lower surface; and a second plate that includes an upper surface, a lower surface, and a plurality of polymer distribution channels connecting the upper surface and the lower surface wherein the plurality of polymer distribution channels consist essentially of substantially horizontal channels at one or both the upper surface and lower surface and substantially linear downwardly sloping channels connecting the substantially horizontal channels at the upper surface to the substantially horizontal channels at the lower surface, the upper surface to the substantially horizontal channels at the lower surface or the substantially horizontal channels at the upper surface to lower surface.

The substantially linear and downward sloping channels may be substantially vertical. The substantially horizontal channels may also be substantially linear. In one embodiment, the first plate comprises at least 8 substantially linear and downward sloping channels and the second plate comprises at least 32 substantially linear and downward sloping channels. In certain embodiments, the linear and substantially downward sloping polymer distribution channels connect to and terminate at diverging lower substantially horizontal channels.

In yet another embodiment, the present invention provides a series of stacked plates for distributing a molten polymer composition to a plurality of spinnerets, wherein the series of stacked plates includes a network of connected polymer distribution channels wherein the connected network of connected polymer distribution channels consists essentially of linear and downward sloping channels disposed within the interior of a plate and a plurality of substantially horizontal channels that are located on one or more surfaces of a plate. In certain desirable embodiments, the substantially linear and downward sloping channels are substantially vertical and the substantially horizontal channels are also substantially linear.

In yet another embodiment, the present invention provides a series of stacked plates for distributing a molten polymer composition that includes: a first plate that comprises an inlet for receiving a molten polymer composition and a substantially horizontal lower surface, the inlet connecting to a plurality of diverging and substantially horizontal channels that are provided on the substantially horizontal lower surface of the first plate; a second plate that comprises a substantially horizontal upper surface, a substantially horizontal lower surface and a plurality of linear and downward sloping channels that connect the diverging and substantially horizontal channels on the lower surface of the first plate to a plurality of diverging and substantially horizontal channels that are provided on the lower surface of the second plate; and a third plate that comprises a substantially horizontal upper surface, a substantially horizontal lower surface and a plurality of substantially downwardly sloping channels that connect the diverging and substantially horizontal channels on the lower surface of the second plate to a plurality of diverging and substantially horizontal channels that are provided on the lower surface of the third plate. The substantially linear and downward sloping channels may be substantially vertical and/or the substantially horizontal channels may be substantially linear. In one desirable embodiment, the substantially linear and downward sloping channels of the second plate connect to and terminate at a plurality of substantially horizontal channels on the substantially horizontal lower surface of the second plate and the substantially linear and downward sloping channels of the third plate connect to and terminate at a plurality of substantially horizontal channels on the substantially horizontal lower surface of the third plate. Furthermore, each of the substantially linear and downward sloping channels of the second and third plates may connect to and terminate at a plurality of diverging substantially horizontal channels. In yet another illustrated embodiment, the second plate comprises from 2 to 16 substantially linear and downward sloping channels and the third plate comprises from 4 to 64 substantially linear and downward sloping channels.

In still yet another embodiment, the present invention provides a series of stacked plates for distributing a molten polymer composition that includes: a first plate that comprises a substantially horizontal upper surface, a substantially horizontal lower surface and a plurality of substantially horizontal channels for receiving a molten polymer composition provided on the substantially horizontal upper surface of the first plate wherein each of the substantially horizontal channels connects to a substantially linear and substantially downwardly sloping channel that terminates at the substantially horizontal lower surface; and a second plate that comprises a substantially horizontal upper surface, a substantially horizontal lower surface and a plurality of substantially horizontal channels for receiving a molten polymer composition from the substantially downwardly sloping channels terminating at the substantially horizontal lower surface of the first plate provided on the substantially horizontal upper surface of the second plate wherein each of the substantially horizontal channels connects to a substantially linear and substantially downwardly sloping channel that terminates at the substantially horizontal lower surface. In yet another embodiment, the present invention provides a series of stacked plates for distributing a molten polymer composition that includes: a first plate that includes a substantially horizontal upper surface, a substantially horizontal lower surface, a plurality of a substantially linear and substantially downwardly sloping channels for receiving a molten polymer composition that connect to and terminate at a plurality of diverging substantially horizontal channels that are provided on the substantially horizontal lower surface; and a second plate that includes a substantially horizontal upper surface, a substantially horizontal lower surface, a plurality of a substantially linear and substantially downwardly sloping channels for receiving a molten polymer composition from the plurality of diverging substantially horizontal channels that are provided on the substantially horizontal lower surface of the first plate wherein each of the substantially linear and substantially downwardly sloping channels connects to and terminates at a plurality of diverging substantially horizontal channels that are provided on the substantially horizontal lower surface of the second plate. Each of the substantially horizontal channels on the substantially horizontal upper surface of the first plate may connect to and terminate at a substantially linear and downward sloping channel, each of the substantially linear and downward sloping channels may connect to and terminate at the lower surface of the first plate and each of the substantially horizontal channels on the substantially horizontal upper surface of the second plate may connect to and terminate at a substantially linear and downwardly sloping channel and each of the substantially linear and downwardly sloping channels may connect to and terminate at the lower surface of the second plate.

In still yet another embodiment, the present invention provides a series of stacked plates for distributing a molten polymer composition to a plurality of spinnerets, wherein the series of stacked plates includes: a first plate that comprises a substantially horizontal lower surface and an inlet for receiving a molten polymer composition connecting to a plurality of diverging and substantially horizontal channels that are provided on the substantially horizontal lower surface of the first plate; a second plate that comprises a substantially horizontal upper surface, a substantially horizontal lower surface and a plurality of substantially horizontal upper channels for receiving a molten polymer composition from the diverging and substantially horizontal channels that are provided on the lower surface of the first plate provided on the substantially horizontal upper surface of the second plate, wherein each of the substantially horizontal upper channels of the second plate connects to a substantially linear and downward sloping channel and each of the substantially linear and downward sloping channels connects to a plurality of diverging and substantially horizontal lower channels that are provided on the substantially horizontal lower surface of the second plate; and a third plate that comprises a substantially horizontal upper surface, a substantially horizontal lower surface and a plurality of substantially horizontal upper channels for receiving a molten polymer composition from the and substantially horizontal lower channels that are provided on the lower surface of the second plate provided on the substantially horizontal upper surface of the third plate, wherein each of the substantially horizontal upper channels connects to a substantially linear and downwardly sloping channel and each of the downwardly sloping channels connecting to a plurality of diverging substantially horizontal lower channels that are provided on the substantially horizontal lower surface of the third plate; and a fourth plate that comprises a substantially horizontal upper surface, a lower surface and a plurality of substantially horizontal upper channels for receiving a molten polymer composition from the substantially horizontal lower channels that are provided on the lower surface of the third plate provided on the substantially horizontal upper surface of the fourth plate, each of the substantially horizontal upper channels connecting to a substantially linear and downward sloping channel, each of the downward sloping channels terminating at the lower surface. Each of the substantially horizontal upper channels on the substantially horizontal upper surface of the second plate may connect to and terminate at a substantially linear and downward sloping channel and each of the substantially linear and downward sloping channels connects to and terminates at a plurality of diverging and substantially horizontal lower channels on the substantially horizontal lower surface of the second plate. Each of the substantially horizontal upper channels on the substantially horizontal upper surface of the third plate may connect to and terminate at a substantially linear and downwardly sloping channel and each of the substantially linear and downwardly sloping channels connects to and terminates at a plurality of substantially horizontal lower channels on the substantially horizontal lower surface of the third plate. Each of the substantially horizontal upper channels on the substantially horizontal upper surface of the fourth plate may connect to and terminate at a substantially linear and downward sloping channel. And, the first plate may further include a substantially horizontal upper surface and the inlet originates at the upper surface and connects to and terminates at a first plurality of intermediate diverging channels which connect to and terminate at a plurality of substantially linear and downwardly sloping channels that each connect to and terminate at the plurality of diverging and substantially horizontal channels that are provided on the substantially horizontal lower surface of the first plate.

BRIEF DESCRIPTION OF THE DRAWINGS

FIG. 1 is a front side view of a series of stacked plates of a first illustrated embodiment of the present invention.

FIG. 2 is a side view of the series of stacked plates of FIG. 1.

FIG. 3 is a perspective, cutaway view of the first plate of FIGS. 1 and 2.

FIG. 4 is a perspective, cutaway view of the second plate of FIGS. 1 and 2.

FIG. 5 is a perspective, cutaway view of the third plate of FIGS. 1 and 2.

FIG. 6 is a perspective, cutaway view of the fourth plate of FIGS. 1 and 2.

FIG. 8 is a perspective, cutaway view of a first plate of a second illustrated embodiment of the present invention.

FIG. 9 is a perspective, cutaway view of a second plate of a second illustrated embodiment of the present invention.

FIG. 10 is a perspective, cutaway view of a third plate of a second illustrated embodiment of the present invention.

FIG. 11 is a perspective, cutaway view of a fourth plate of a second illustrated embodiment of the present invention.

FIG. 14 is a perspective view of a third plate of a bicomponent embodiment of the present invention.

FIG. 15 is a perspective view of a fourth plate of a bicomponent embodiment of the present invention.

DETAILED DESCRIPTION OF REPRESENTATIVE EMBODIMENTS

The present invention provides an extrusion head that comprises a series of stacked plates that connect an inlet to a plurality of orifices, desirably for extruding filaments and threads form a molten polymer resin. The inlet is connected to orifices by a network of substantially linear and downwardly sloping channels and substantially horizontal channels that are provided in two or more plates that are included in the series of stacked plates. In one desirable embodiment, the extrusion head can be made of a plurality of plates which comprise substantially linear, downward sloping channels and substantially horizontal channels in order to facilitate manufacture and machining of the plates. The substantially horizontal channels occur at the surfaces of the plates and facilitate maintenance and cleaning of the plates.

The downwardly sloping and horizontal channels connect channels from the preceding plate to the channels in the following plate to form the network of channels. The network of channels is formed when the plurality of plates are properly aligned and stacked in order. The stacked plates can be bolted together to contain molten polymer under pressures typically encountered during melt extrusion of molten polymers, for example during pressures needed to melt extrude polyolefin filaments. The stacked plates may be provided with a means for heating the plates in order to keep the molten polymer at a constant temperature during melt processing of the polymer.

Figure 7:
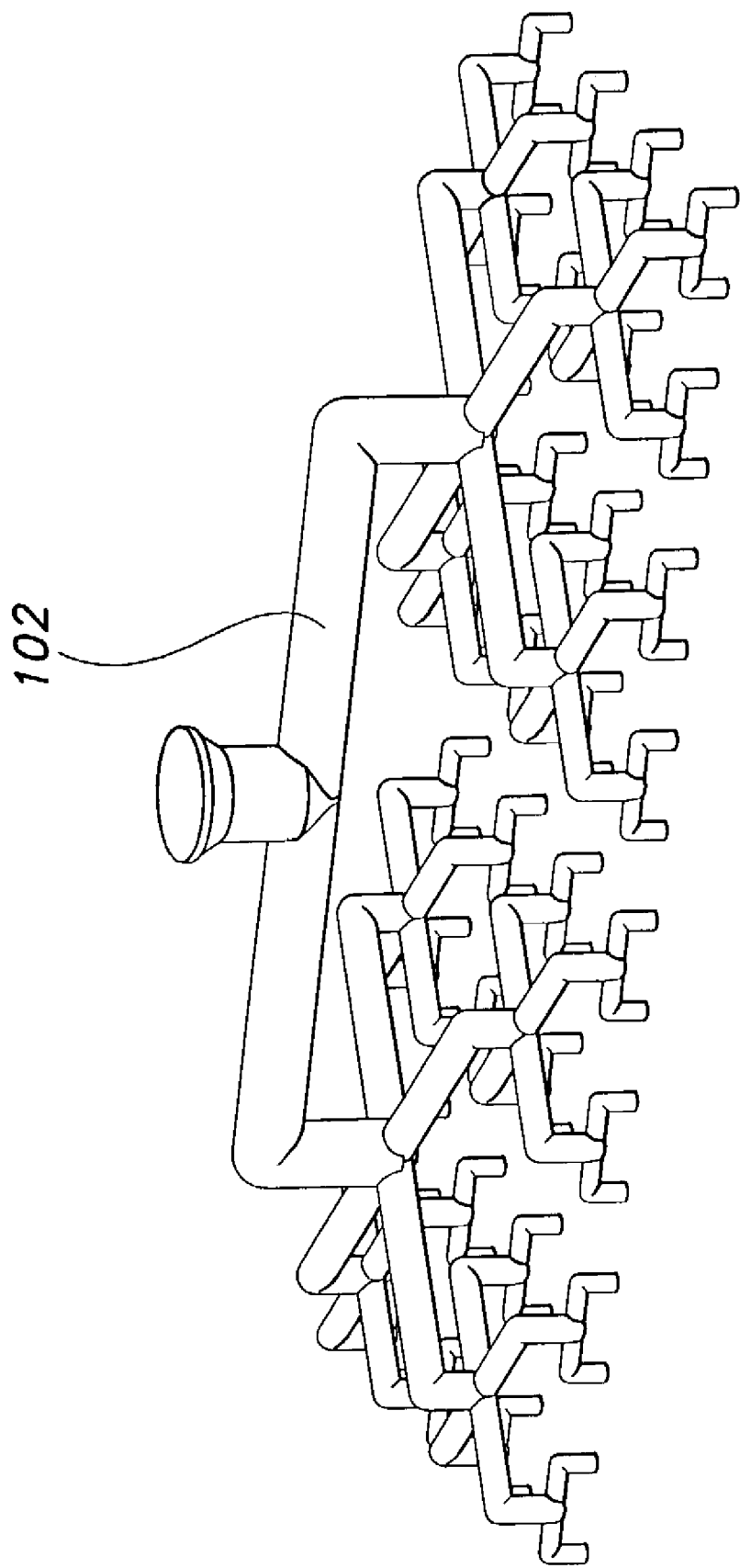
FIG. 7 is a perspective view of the polymer flow path through the plates illustrated in FIGS. 1–6.

One representative embodiment of the present invention is illustrated in FIGS. 1 through 7. FIG. 1 is a front side view of a series of stacked plates that illustrates a system for distribution of molten polymer resin through channels that are provided in a series of stacked plates 100. FIG. 2 is a side view of the series of stacked plates of FIG. 1. The series of stacked plates includes at least two stacked plates that include substantially horizontal channels at the upper surface and/or lower surface of the plate and substantially linear downwardly sloping channels connecting the substantially horizontal channels at the upper surface to the substantially horizontal channels at the lower surface, the upper surface to the substantially horizontal channels at the lower surface or the substantially horizontal channels at the upper surface to lower surface. In the embodiment illustrated herein and described below the series of stacked plates includes four stacked plates: a first plate 110, a second plate 120, a third plate 130, and a fourth plate 140. The plates can be stacked in order and aligned to form a network of connected polymer distribution channels such as illustrated in FIG. 7. FIG. 7 is a perspective view of polymer that has been solidified and removed from the polymer distribution system illustrated in FIGS. 1–6, and as such FIG. 7 represents a perspective view of the molten polymer flow path through the plates illustrated in FIGS. 1–6 and illustrates the flow path of polymer 102 through the channels formed when first plate 110, second plate 120, a third plate 130, and fourth plate 140 are properly aligned and connected in series. FIG. 7 further illustrates that molten polymer can be distributed evenly and uniformly through a series of stacked plates. Ideally, the molten polymer travels an equal distance and time to arrive at similar points in the distribution system. For example, the distances from the inlet to each of the final outlet ports on the last plate should be substantially equal. Specifically, molten polymer should travel substantially the same distance and substantially the same amount of time, that is have the same or substantially similar processing histories at similar points in the apparatus and in the process.

Generally, the illustrated polymer distribution system includes a stacked plate distributor made up of a series of stacked plates. The stacked plate distribution system geometrically splits and distributes polymer supplied via a polymer supply conduit to a series of increasingly smaller channels as illustrated in FIG. 7. The distribution system eventually connects to spinnerets for spinning fibers. Spinnerets are known in the industry. In the embodiment illustrated in FIGS. 1–7, the first plate 110 divides molten polymer supplied by polymer supply conduit into eight smaller and symmetric channels. The second plate then geometrically splits each of the channels supplied from the first plate into four symmetric and even smaller channels. The third plate finally splits each smaller channel into two even smaller channels, resulting in sixty-four channels per polymer supply conduit. The fourth plate directs each of the channels to a funnel that supplies polymer to a spinneret for spinning molten polymer into fibers. Spinnerets are well known and are described and illustrated in U.S. Pat. No. 4,445,833, which is hereby incorporated by reference in its entirety herein.

First plate 110 is illustrated in perspective in FIG. 3 and includes an inlet 113 for receiving a molten polymer composition that is provided to upper surface 112 and a substantially horizontal lower surface 119 that can be stacked on the second plate 120. The inlet 113 connects to a plurality of diverging and substantially horizontal channels 118 that are provided on the substantially horizontal lower surface 119 of the first plate 110 via two diverging substantially horizontal intermediate channels 114 and two substantially downwardly sloping channels 116 to split the polymer flow path provided from the inlet into two substantially equal distribution paths. Each horizontal channel 114 connects to and terminates at a substantially vertical channel 116. Each vertical channel 116 connects to and terminates at a plurality of diverging lower substantially horizontal channels 118 that are provided on the lower surface 119 of the first plate 110. In one desirable embodiment, the first plate 110 includes four diverging lower horizontal channels 118 at the end of each vertical channel 116 to divide the polymer path into eight equal distribution paths at the lower surface 119 of the first plate 110. Persons of skill in the art will appreciate that the polymer paths can be divided into a greater or lesser number of equal distribution paths. For example, each vertical channel 116 can be divided into 2, 3, 5, 6, etc. diverging horizontal and equal distribution paths.

First plate 110 rests on and aligns with a second plate 120 that is illustrated in perspective in FIG. 4. Second plate 120 includes a network of channels that further divides and distributes molten polymer that is provided from first plate 110. Specifically, second plate 120 includes a substantially horizontal upper surface 122, a substantially horizontal lower surface 129 and channels that connect the two surfaces. In the illustrated embodiment, the second plate 120 is provided with a plurality of substantially horizontal upper channels 124 on the horizontal upper surface 122 that complement the substantially horizontal channels 118 that are provided on the lower surface 119 of the first plate 110. The horizontal upper channels 124 receive molten polymer from the substantially horizontal channels 118 that are provided on the lower surface 119 of the first plate 110. Each horizontal upper channel 124 terminates at and connects to a substantially linear and downward sloping channel 126. In the illustrated embodiments, each substantially linear and downward sloping channel 126 connects to and terminates at four diverging and substantially horizontal lower channels 128 that are provided on the substantially horizontal lower surface 129 of the second plate 120. The substantially horizontal lower channels 128 at the lower surface 129 of the second plate 120 divide the polymer provided from the inlet into thirty-two equal distribution paths at the lower surface 129 of the second plate 120.

Second plate 120 rests on and aligns with a third plate 130 that is illustrated in perspective in FIG. 5. Third plate 130 includes a network of channels that further divides and distributes molten polymer that is provided from second plate 120. Specifically, third plate 130 includes a substantially horizontal upper surface 132, a substantially horizontal lower surface 139 and channels that connect the two surfaces. In the illustrated embodiment, the third plate 130 is provided with a plurality of substantially horizontal upper channels 134 on the horizontal upper surface 132 that complement the substantially horizontal channels 128 that are provided on the lower surface 129 of the second plate 120. The horizontal upper channels 134 receive molten polymer from the substantially horizontal channels 128 that are provided on the lower surface 129 of the second plate 120. Each horizontal upper channel 134 terminates at and connects to a substantially linear and downward sloping channel 136. In the illustrated embodiments, each substantially linear and downward sloping channel 136 connect to and terminates at two diverging and substantially horizontal lower channels 138 that are provided on the substantially horizontal lower surface 139 of the third plate 130. The substantially horizontal lower channels 138 at the lower surface 139 of the third plate 130 divide the polymer provided from the inlet into sixty-four equal distribution paths at the lower surface 139 of the third plate 130.

Third plate 130 rests on and aligns with a fourth plate 140 that is illustrated in perspective in FIG. 6. The fourth plate includes a substantially horizontal upper surface 142, a lower surface 149 and a plurality of substantially horizontal upper channels 144 for receiving a molten polymer composition from the substantially horizontal lower channels 138 that are provided on the lower surface 139 of the third plate 130. The substantially horizontal upper channels 144 for receiving a molten polymer composition on the upper surface 142 of the fourth plate 140 complement the substantially horizontal lower channels 138 that are provided on the lower surface 139 of the third plate 130. The substantially horizontal upper channels 144 are provided on the substantially horizontal upper surface 142 of the fourth plate 140. Each of the substantially horizontal upper channels 144 terminates at and connects to a substantially linear and downward sloping channel 146 and each of the downward sloping channels 146 terminates at the substantially horizontal lower surface 149 of the fourth plate.

In desirable embodiments, such as the embodiments illustrated herein, the substantially linear and downward sloping channels are substantially vertical in order to facilitate manufacture and maintenance of the plates. The substantially horizontal channels may also be substantially linear in order to further facilitate manufacture and maintenance of the plates. It is also desirable that the edges of the plates have chamfered edges 180 as illustrated to facilitate separation of the plates from each other. The plates may also include through holes 190 to accommodate bolts or other fasteners for bolting or otherwise fastening the plates together. It is also suggested that the corners, for example where a horizontal channel terminates and connects to a downward channel, be a smooth sweeping downward turn in order to further decrease polymer retention at the corners. It is also suggested that the channels in the plates are configured to distribute polymer evenly by distributing molten polymer substantially equal lengths and substantially equal processing times at similar positions in the polymer distribution system.

In the embodiment illustrated in FIGS. 1–6, each of the substantially horizontal upper channels 124 on the substantially horizontal upper surface 122 of the second plate 120 connects to and terminates at a substantially linear and downward sloping channel 126 and each of the substantially linear and downward sloping channels 126 connects to and terminates at a plurality of diverging and substantially horizontal lower channels 128 on the substantially horizontal lower surface 129 of the second plate 120. The first plate 110 further comprises a substantially horizontal upper surface 112 and the inlet 113 originates at one end on the upper surface 112 and connects to and terminates at a first plurality of diverging channels 114 which connect to and terminate at the substantially linear and downwardly sloping channels 116 that connect to and terminate at the plurality of diverging and substantially horizontal channels 118 that are provided on the substantially horizontal lower surface 119 of the first plate 110. Likewise, each of the substantially horizontal upper channels 134 on the substantially horizontal upper surface 132 of the third plate 130 connects to and terminates at a substantially linear and downwardly sloping channel 136 and each of the substantially linear and downwardly sloping channels 136 connects to and terminates at a plurality of substantially horizontal lower channels 138 on the substantially horizontal lower surface 139 of the third plate 130. And, finally each of the substantially horizontal upper channels 144 on the substantially horizontal upper surface 142 of the fourth plate 140 connects to and terminates at a substantially linear and downward sloping channel 146 and each of the substantially linear and downward sloping channels 146 terminate at the substantially horizontal lower surface 149 of the fourth plate 140.

In the embodiment illustrated in FIGS. 1–7, the plurality of substantially horizontal channels 124 on the upper surface 122 of the second plate 120 complement the horizontal channels 118 that are provided on the lower surface 119 of the first plate 110 and the plurality of substantially horizontal channels 134 on the upper surface 132 of the third plate 130 complement the horizontal channels 128 that are provided on the lower surface 129 of the second plate 120. The channels are rounded and have rounded corners in order to decrease polymer retention at the edges of the channels and the corners. However, the channels may be of other shapes such as illustrated in FIGS. 8–11 which illustrate some channels having U-shaped cross-sections.

FIGS. 8 through 11 illustrate a second exemplary embodiment of the present invention. In FIGS. 8–11, first plate 210, second plate 220, third plate 230 and fourth plate 240 do not include horizontal channels, either full or partial, on both upper and lower surfaces. Rather, the plates include channels on one surface, either the top surface or the bottom surface. In this embodiment, the channels provided at the top surface or the bottom surface of a plate do not complement matching channels on the next, adjacent plate and thus constitute the full volume of the channel in that plane. The series of stacked plates for distributing a molten polymer composition include a first plate 210 that is illustrated in a perspective, cutaway view. Illustrated first plate 210 includes an inlet 213 for receiving a molten polymer composition located on an upper surface 212 and a substantially horizontal lower surface 219. The inlet 213 connects to a plurality of diverging channels 214 and each of the diverging channels 214 connects to or includes a substantially linear and downward sloping channel 216 that terminates at the substantially horizontal lower surface 219 of the first plate 210. The first plate 210 aligns with the second plate 220 that includes a substantially horizontal upper surface 222, a substantially horizontal lower surface 229 and a plurality of substantially horizontal channels 224 for receiving a molten polymer composition from the substantially linear and downward sloping channels 216 that terminate at the lower surface 219 of the first plate 210. In this illustrated exemplary embodiment, substantially horizontal channels 224 are provided on the substantially horizontal upper surface 222 of the second plate 220 and each of the substantially horizontal channels 224 connects to a substantially linear and substantially downwardly sloping channel 226 that terminates at the substantially horizontal lower surface 229. The second plate 220 aligns with the third plate 230 that includes a substantially horizontal upper surface 232, a substantially horizontal lower surface 239 and a plurality of substantially horizontal channels 234 for receiving a molten polymer composition from the substantially downwardly sloping channels 226 terminating at the substantially horizontal lower surface 229 of the second plate 220. Substantially horizontal channels 234 are provided on the substantially horizontal upper surface 232 of the third plate 230 and each of the substantially horizontal channels 234 connects to a substantially linear and substantially downwardly sloping channel 236 that terminates at the substantially horizontal lower surface 239. And, the third plate 230 aligns with the fourth plate 240 that includes a substantially horizontal upper surface 242, lower surface 249 and a plurality of substantially horizontal channels 244 for receiving a molten polymer composition from substantially downwardly sloping channels 236 terminating at the substantially horizontal lower surface 239 of the third plate 230. Substantially horizontal channels 244 are provided on the substantially horizontal upper surface 242 of the fourth plate 240 and each of the horizontal channels 244 connects to a substantially linear and substantially downwardly sloping channel 246, wherein each of the substantially downwardly sloping channels 246 terminates on the lower surface 249.

Thus, a second representative embodiment of the present invention is illustrated in FIGS. 8 through 11. This second representative embodiment differs from the previous, first representative embodiment in that the second and third plates of the second representative embodiment only include one set of substantially horizontal channels per second and third plate on either the upper or lower surface of the plate. In this alternate embodiment, a set of substantially horizontal channels in a plate comprises the entire volume or diameter of the horizontal channels and the horizontal channels in the plate are all in on one side of a plate. In the previous representative embodiment, the second and third plates each include an upper set of substantially horizontal channels and a lower set of substantially horizontal channels as illustrated in FIGS. 1, 2, 4 and 5. In the first illustrated embodiment, the upper set of horizontal channels 124 of second plate connect 120 are half pipes that connect to and complement similar channels 118 on the lower surface 119 of the first plate 110 above. Similarly, the upper set of horizontal channels 134 of third plate connect 130 are half pipes that connect to and complement similar channels 128 on the lower surface 129 of the second plate 120 above and the upper set of horizontal channels 144 of fourth plate connect 140 are half pipes that connect to and complement similar channels 138 on the lower surface 139 of the third plate 130 above. In yet another embodiment that is not illustrated, the plates do not include channels on the upper surface and include channels on only the lower surfaces. For example, first plate 210 could include diverging, horizontal channels on lower surface 219 that are similar to and serve the same function as horizontal channels 224 on the upper surface 222 of second plate 220; second plate 220 would include diverging horizontal, channels on lower surface 229 that are similar to and serve the same function as channels 234 on the upper surface 232 of third plate 230; and third plate 230 would include diverging, horizontal channels on lower surface 239 that are similar to and serve the same function as channels 244 on the upper surface 242 of fourth plate 240. Again, the number of diverging, horizontal channels can vary from the number illustrated.

Figure 17:
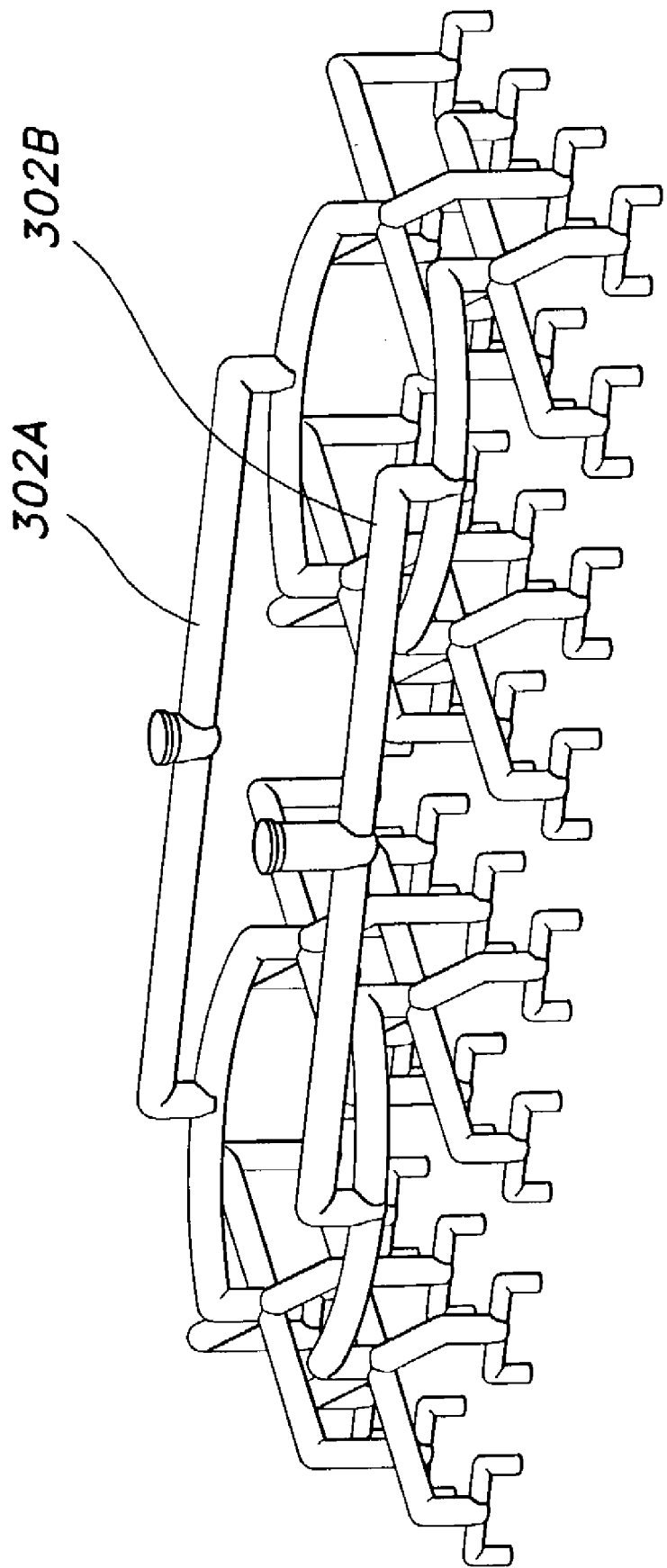
FIG. 17 is a perspective view of the polymer flow paths of two separate polymers through the plates illustrated in FIGS. 12–16.
Figure 18:
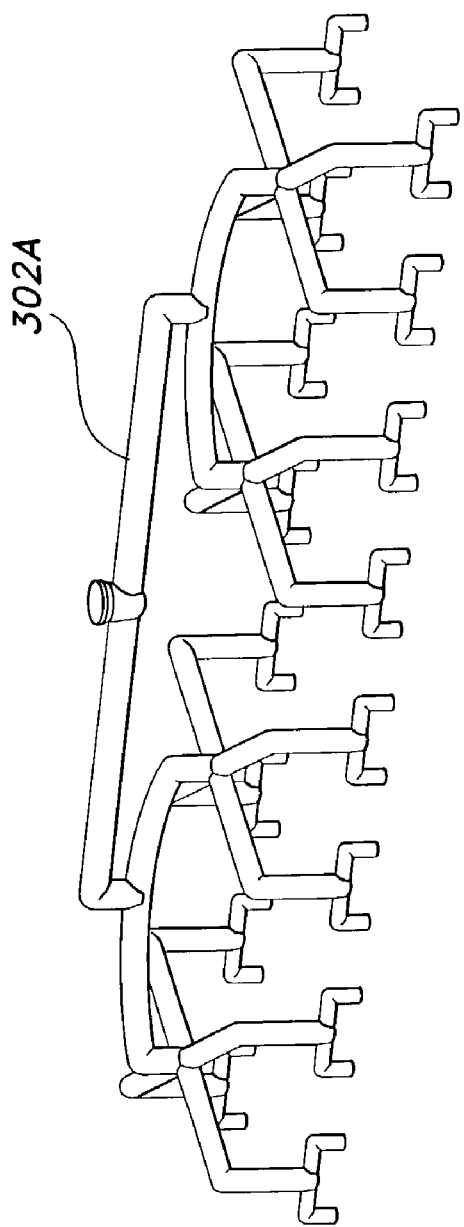
FIG. 18 is a perspective view of the polymer flow path of a first polymer through the plates illustrated in FIGS. 12–16.
Figure 19:
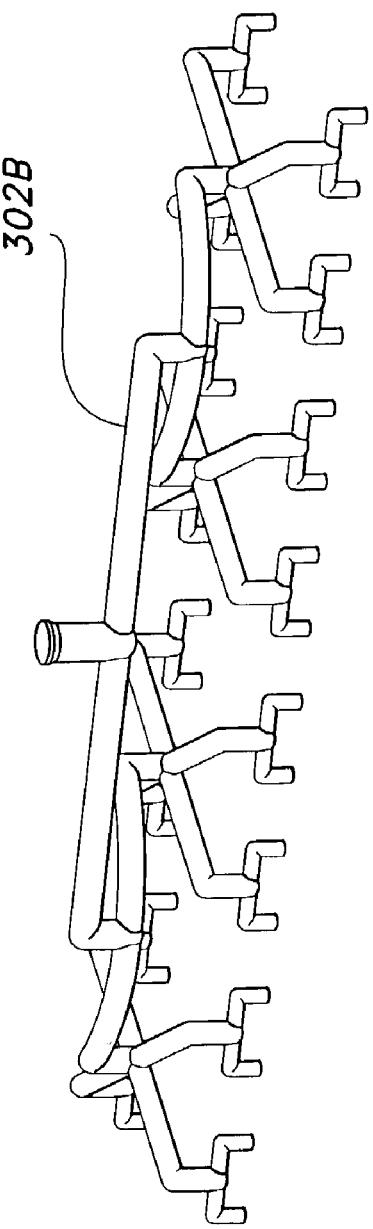
FIG. 19 is a perspective view of the polymer flow path of a second polymer through the plates illustrated in FIGS. 12–16.

The present invention also includes and provides multi-component polymer distribution systems, for example bicomponent polymer distribution systems for distributing two or more separate molten polymers. An exemplary multicomponent polymer distribution system of the present invention, specifically a bicomponent polymer distribution system, is illustrated in FIGS. 12 through 19. The illustrated exemplary distribution system includes five plates: a first plate 310, a second plate 320, a third plate 330, a fourth plate 340 and a fifth plate 350, that can be stacked and aligned vertically in a series to distribute two different and separate molten polymer compositions, for purposes of illustration designated as A and B. The two polymers, A and B, can be for example polypropylene and polyethylene and can be used to spin bicomponent fibers. Exemplary bicomponent fibers include, but are not limited to, side-by-side bicomponent fibers and sheath-core bicomponent fibers. FIG. 17 illustrates in perspective, the flow path of polymer A 302A and the flow path of polymer B 302B through the plates illustrated in FIGS. 12–16 when properly aligned and vertically stacked. FIG. 18 illustrates in perspective the flow path of polymer A 302A alone and FIG. 19 illustrates in perspective the flow path 302B of polymer B alone for easier viewing. It should be noted that although the flow paths 302A and 302B cross over each other, the flow paths never intersect and the respective polymers A and B are kept separate and are provided to the spinnerets separately so that bicomponent fibers can be formed.

Figure 12:
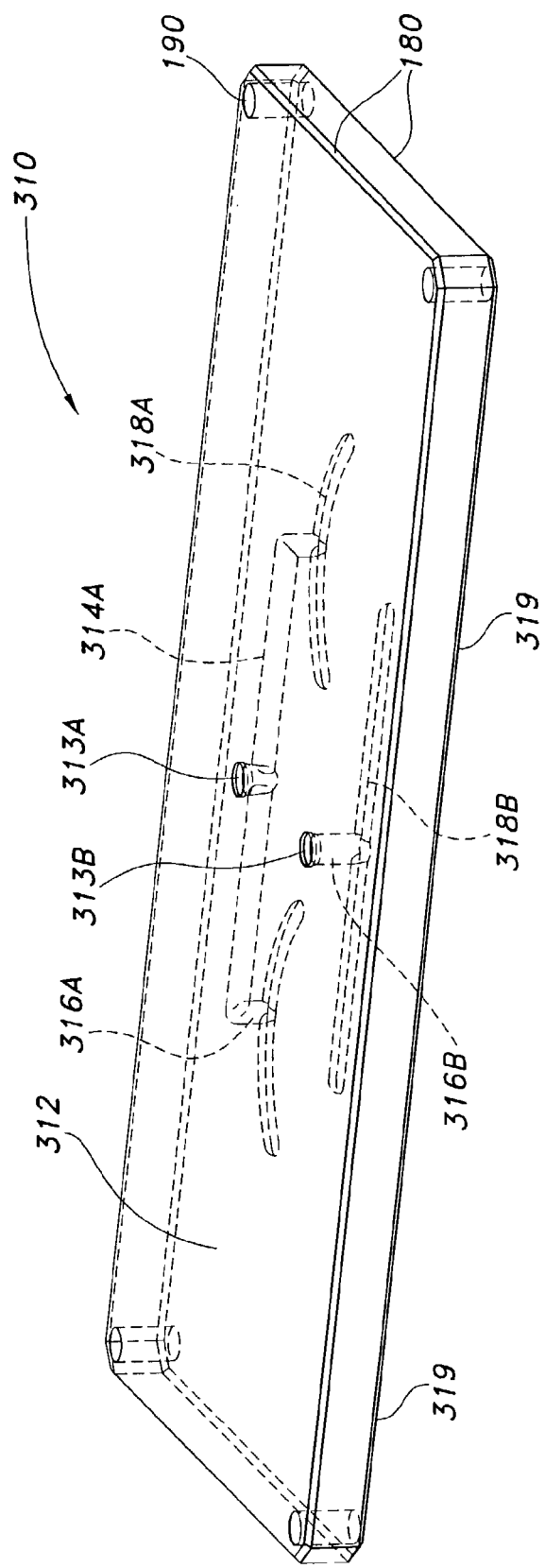
FIG. 12 is a perspective view of a first plate of a bicomponent embodiment of the present invention.

Turning now to FIG. 12, first plate 310 is illustrated in perspective using dashed lines to illustrate the channels within the plate. First plate 310 receives a first polymer (A) at a first inlet 313A and a second polymer (B) at inlet 313B. First plate 310 includes a substantially horizontal lower surface 319 that can be stacked on a second plate 320 that is similarly illustrated in perspective in FIG. 13. Inlet 313A connects to a plurality of diverging and substantially horizontal channels 318A that are provided on the substantially horizontal lower surface 319 of the first plate 310 via two diverging substantially horizontal intermediate channels 314A and two substantially downwardly sloping channels 316A to split the polymer flow path A as provided from inlet 313A into four equal diverging distribution paths at the bottom of first plate 310. Each horizontal channel 314A connects to and terminates at a substantially vertical channel 316A. Each vertical channel 316A connects to and terminates at a plurality of diverging lower substantially horizontal channels 318A that are provided on the lower surface 319 of the first plate 310 to split the polymer flow path A provided from the inlet 313A into four equal distribution paths at the lower surface 319 of the first plate 310. Inlet 313B connects to two diverging and substantially horizontal channels 318B that are provided on the substantially horizontal lower surface 319 of the first plate 310 via downwardly sloping channel 316B to split the polymer flow path B provided from the inlet 313B into two equal and diverging distribution paths.

Figure 13:
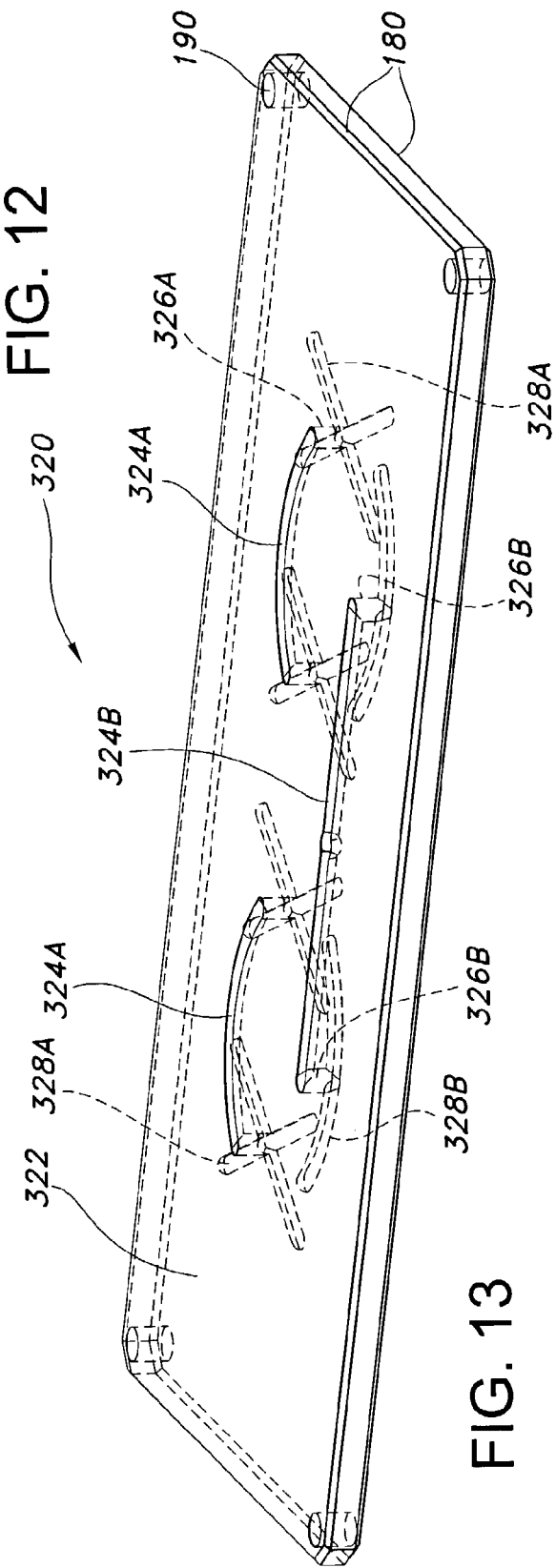
FIG. 13 is a perspective view of a second plate of a bicomponent embodiment of the present invention.

First plate 310 rests on and aligns with second plate 320 that is illustrated in perspective in FIG. 13. Second plate 320 includes a network of channels that further divides and distributes molten polymers A and B from first plate 310. Specifically, second plate 320 includes a substantially horizontal upper surface 322, a substantially horizontal lower surface 329 and two sets of channels, one for each polymer flow path, that connect the two surfaces. In the embodiment illustrated in FIG. 13, second plate 320 is provided with a plurality of substantially horizontal upper channels 324A on the horizontal upper surface 322 of the second plate 320 that complement the substantially horizontal channels 318A that are provided on the lower surface 319 of the first plate 310. Second plate 320 also includes a second set of substantially horizontal upper channels 324B on the horizontal upper surface 322 that complement the substantially horizontal channels 318B that are provided on the lower surface 319 of the first plate 310. The horizontal upper channels 324A receive molten polymer A from the substantially horizontal channels 318A that are provided on the lower surface 319 of the first plate 310 and horizontal upper channels 324B receive molten polymer B from the substantially horizontal channels 318B that are provided on the lower surface 319 of the first plate 310. Polymers A and B have separate flow paths that do not intersect, thus keeping polymer A separate from polymer B. Once polymer streams A and B are in relatively close proximity, two separate streams of A and B can be brought together to form bicomponent fibers. Spinnerets for forming bicomponent fibers are known. Spinnerets that can be used to form bicomponent fibers are described and illustrated in U.S. Pat. Nos. 5,466,410 and 6,120,276 which are hereby incorporated by reference herein in their entireties. Each horizontal upper channel 324 terminates at and connects to a substantially linear and downward sloping channel 326. In the embodiment illustrated in FIG. 13, each substantially linear and downward sloping channel 326A connects to and terminates at four diverging and substantially horizontal lower channels 328A that are provided on the substantially horizontal lower surface 329 of the second plate 320 and each substantially linear and downward sloping channel 326B connects to and terminates at two diverging and substantially horizontal lower channels 328B that are provided on the substantially horizontal lower surface 329 of the second plate 320. Thus, polymer component A is divided into 16 equal flow paths at the lower surface 329 of second plate 320 and polymer B is divided into 4 equal flow paths at the lower surface 329 of second plate 320.

Second plate 320 rests on and aligns with a third plate 330 that is illustrated in perspective in FIG. 14. Third plate 330 includes a network of channels that further divides and distributes molten polymers A and B from second plate 320. Specifically, third plate 330 includes a substantially horizontal upper surface 332, a substantially horizontal lower surface 339 and two sets of channels, set A and set B, that connect the two surfaces 332 and 339. In the embodiment illustrated in FIG. 14, third plate 330 is provided with a plurality of substantially horizontal upper channels 334A on the horizontal upper surface 332 that complement the substantially horizontal channels 328A that are provided on the lower surface 329 of the second plate 320. Third plate 330 also includes substantially horizontal upper channels 334B on the horizontal upper surface 332 that complement the substantially horizontal channels 328B that are provided on the lower surface 329 of the second plate 320. The horizontal upper channels 334A receive molten polymer A from the substantially horizontal channels 328A that are provided on the lower surface 329 of the second plate 320 and horizontal upper channels 334B receive molten polymer B from the substantially horizontal channels 328B that are provided on the lower surface 329 of the second plate 320. Again, polymer A and polymer B have separate flow paths that do not intersect, thus keeping polymer A separate from polymer B. Also, in this exemplary embodiment each horizontal upper channel 334 terminates at and connects to a substantially linear and downward sloping channel 336. In the embodiment illustrated in FIG. 14, each substantially linear and downward sloping channel 336A terminates at horizontal lower surface 339 of the third plate 330 and each substantially linear and downward sloping channel 336B connects to and terminates at four diverging and substantially horizontal lower channels 338B that are provided on the substantially horizontal lower surface 339 of the third plate 330. Thus, polymer component A remains at 16 equal and diverging flow paths at the lower surface 339 of third plate 330 and polymer B is now also divided into 16 equal and diverging flow paths at the lower surface 339 of third plate 330.

Third plate 330 rests on and aligns with a fourth plate 340 that is illustrated in perspective in FIG. 15. Fourth plate 340 includes a network of channels that further divides and distributes molten polymers A and B from third plate 330. Specifically, fourth plate 340 includes a substantially horizontal upper surface 342, a substantially horizontal lower surface 349 and two sets of channels, set A and set B, that connect the two surfaces. In the embodiment illustrated in FIG. 15, fourth plate 340 is provided with a plurality of substantially horizontal upper channels 344B on the horizontal upper surface 342 that complement the substantially horizontal channels 338B that are provided on the lower surface 339 of the third plate 330. The horizontal upper channels 344B receive molten polymer B from the substantially horizontal channels 338B that are provided on the lower surface 339 of the third plate 330. Substantially linear downward sloping channels 346A receive molten polymer A from the substantially linear and downward sloping channels 336A that are provided on the lower surface 339 of the third plate 330. Note that polymers A and B still have separate flow paths. In the illustrated embodiment, each horizontal upper channel 344B terminates at and connects to a substantially linear and downward sloping channel 346B and each substantially linear and downward sloping channel 346A and 346B connects to and terminates at two diverging and substantially horizontal lower channels 348A and 348B, respectively, that are provided on the substantially horizontal lower surface 349 of the fourth plate 340. Thus, polymer component A is divided into 32 equal and diverging flow paths at the lower surface 349 of fourth plate 340 and polymer B is also divided into 32 equal and diverging flow paths at the lower surface 349 of fourth plate 340.

Figure 16:
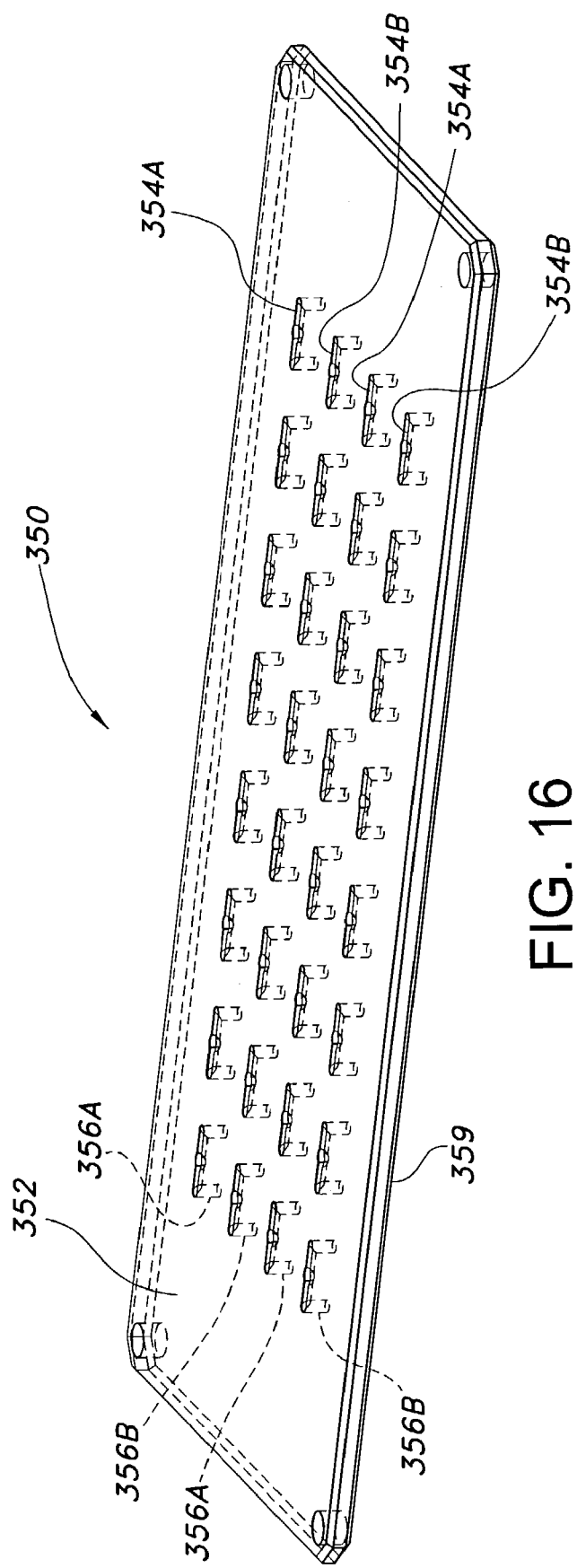
FIG. 16 is a perspective view of a fifth plate of a bicomponent embodiment of the present invention.

Fourth plate 340 rests on and aligns with a fifth plate 350 that is illustrated in perspective in FIG. 16. Fifth plate 350 also includes a network of channels that further divides and distributes molten polymers A and B from fourth plate 340. Specifically, fifth plate 350 includes a substantially horizontal upper surface 352, a substantially horizontal lower surface 359 and two sets of channels, set A and set B, that connect the two surfaces. In the embodiment illustrated in FIG. 16, fifth plate 350 is provided with a plurality of substantially horizontal upper channels 354A and 354B on the horizontal upper surface 352 that complement the substantially horizontal channels 348A and 348B, respectively, that are provided on the lower surface 349 of the fourth plate 340. The horizontal upper channels 354A receive molten polymer A from the substantially horizontal channels 348A that are provided on the lower surface 349 of the fourth plate 340 and horizontal upper channels 354B receive molten polymer B from the substantially horizontal channels 348B that are provided on the lower surface 349 of the fourth plate 340. Again, polymer A and polymer B have separate flow paths that do not intersect, thus keeping polymer A separate from polymer B. Each horizontal upper channel 354A and 354B terminates at and connects to a substantially linear and downward sloping channel 356A and 356B, respectively. Thus, polymer component A remains at 32 equal flow paths at the lower surface 359 of fifth plate 350 and polymer B also remains at 32 equal flow paths at the lower surface 359 of second plate 350. Each flow path may then connect to a spinneret for spinning fibers. Specifically, polymer streams A and B may be converged and combined to form bicomponent fibers using methods and devices that are known in the art.

Multiple stacks of plates can be aligned in a series lengthwise to form a spin beam made up of the lengthwise series of stacked plates in a line. For example, a 200-inch long spin beam can be made by lining up eight 25-inch long stacks of plates, where 25 inches is the longer plate dimension. Each stack of plates of present invention can have its own spin pump to minimize channel lengths and minimize funnel volume.

While the present invention has been described in detail with respect to the specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

We claim:

1. A series of stacked plates for distributing a molten polymer composition to a plurality of spinnerets, the series of stacked plates comprising:
    a first plate that comprises a substantially horizontal lower surface and an inlet for receiving a molten polymer composition connecting to a plurality of diverging and substantially horizontal channels that are provided on the substantially horizontal lower surface of the first plate;
    a second plate that comprises a substantially horizontal upper surface, a substantially horizontal lower surface and a plurality of substantially horizontal upper channels for receiving a molten polymer composition from the diverging and substantially horizontal channels that are provided on the lower surface of the first plate provided on the substantially horizontal upper surface of the second plate, wherein each of the substantially horizontal upper channels of the second plate connects to a substantially linear and downward sloping channel and each of the substantially linear and downward sloping channels connects to a plurality of diverging and substantially horizontal lower channels that are provided on the substantially horizontal lower surface of the second plate; and
    a third plate that comprises a substantially horizontal upper surface, a substantially horizontal lower surface and a plurality of substantially horizontal upper channels for receiving a molten polymer composition from the diverging and substantially horizontal lower channels that are provided on the lower surface of the second plate provided on the substantially horizontal upper surface of the third plate, wherein each of the substantially horizontal upper channels connects to a substantially linear and downwardly sloping channel and each of the downwardly sloping channels connects to a plurality of diverging substantially horizontal lower channels that are provided on the substantially horizontal lower surface of the third plate; and
    a fourth plate that comprises a substantially horizontal upper surface, a lower surface and a plurality of substantially horizontal upper channels for receiving a molten polymer composition from the substantially horizontal lower channels that are provided on the lower surface of the third plate provided on the substantially horizontal upper surface of the fourth plate, each of the substantially horizontal upper channels connecting to a substantially linear and downward sloping channel, each of the downward sloping channels terminating at the lower surface.

2. The series of stacked plates of claim 1, wherein the substantially linear and downward sloping channels are substantially vertical.

3. The series of stacked plates of claim 1, wherein the substantially horizontal channels are also substantially linear.

4. The series of stacked plates of claim 1, wherein:
    each of the substantially horizontal upper channels on the substantially horizontal upper surface of the second plate connects to and terminates at a substantially linear and downward sloping channel and each of the substantially linear and downward sloping channels connects to and terminates at a plurality of diverging and substantially horizontal lower channels on the substantially horizontal lower surface of the second plate;

each of the substantially horizontal upper channels on the substantially horizontal upper surface of the third plate connects to and terminates at a substantially linear and downwardly sloping channel and each of the substantially linear and downwardly sloping channels connects to and terminates at a plurality of diverging substantially horizontal lower channels on the substantially horizontal lower surface of the third plate;

each of the substantially horizontal upper channels on the substantially horizontal upper surface of the fourth plate connects to and terminates at a substantially linear and downward sloping channel; and the first plate further comprises a substantially horizontal upper surface with the inlet originating at the upper surface and connecting to and terminating at a first plurality of intermediate diverging channels which connect to and terminate at a plurality of substantially linear and downwardly sloping channels that each connect to and terminate at the plurality of diverging and substantially horizontal channels that are provided on the substantially horizontal lower surface of the first plate.

5. The series of stacked plates of claim 4, wherein the substantially linear and downward sloping channels are substantially vertical.

6. The series of stacked plates of claim 1, wherein the second plate comprises from 2 to 16 substantially linear and substantially vertical channels and the third plate comprises from 4 to 64 substantially linear and substantially vertical channels.

7. The series of stacked plates of claim 1, wherein the plurality of substantially horizontal channels on the upper surface of the second plate complement the horizontal channels that are provided on the lower surface of the first plate and the plurality of substantially horizontal channels on the upper surface of the third plate complement the horizontal channels that are provided on the lower surface of the second plate.

* * * * *